United States Patent [19]

Yamamoto

[11] Patent Number: 5,452,351
[45] Date of Patent: Sep. 19, 1995

[54] ELECTRONIC PRIVATE BRANCH EXCHANGE HAVING AN LCR FUNCTION AND A METHOD OF ACCESSING A PARTICULAR COMMON CARRIER IN THAT EXCHANGE

[75] Inventor: Keiji Yamamoto, Hino, Japan

[73] Assignee: Kabushiki Kaisha Toshiba, Kawasaki, Japan

[21] Appl. No.: 269,618

[22] Filed: Jul. 1, 1994

Related U.S. Application Data

[63] Continuation of Ser. No. 711,959, Jun. 7, 1991, abandoned.

[30] Foreign Application Priority Data

Jun. 8, 1990 [JP] Japan .................... 2-150227

[51] Int. Cl.⁶ .................... H04M 7/00; H04M 15/00; H04M 3/42; H04M 3/00
[52] U.S. Cl. .................... 379/221; 379/115; 379/207; 379/216; 379/234; 379/243
[58] Field of Search ............... 379/112, 115, 126, 216, 379/219, 220, 221, 355, 234, 242, 243, 201, 207

[56] References Cited

U.S. PATENT DOCUMENTS

| | | | |
|---|---|---|---|
| 4,486,626 | 12/1984 | Kohler | 379/221 X |
| 4,791,665 | 12/1988 | Bogart et al. | 379/221 X |
| 5,086,456 | 2/1992 | Shizawa et al. | 379/221 X |

FOREIGN PATENT DOCUMENTS 2162720 2/1986 United Kingdom .

Primary Examiner—James L. Dwyer
Assistant Examiner—Harry S. Hong
Attorney, Agent, or Firm—Finnegan, Henderson, Farabow, Garrett & Dunner

[57] ABSTRACT

A call origination is made through a common carrier of the minimum line cost among a plurality of common carriers on the basis of input dial data. When a particular common carrier number is detected in the input dial data, a call origination is made preferentially through the particular common carrier corresponding to the carrier number. Thus a reduction in the communication cost using an ordinary LCR function is further made. In addition, an access to a desired common carrier is made by a very simple calling operation similar to the ordinary call operation.

16 Claims, 5 Drawing Sheets

| | | | $C_1$ (HOUR) |
|---|---|---|---|
| | | $B_1$ (HOUR) | $C_2$ (MIN.) |
| | START TIME $A_1$ (HOUR) | $B_2$ (MIN.) | |
| 1 | START TIME $A_2$ (MIN.) | (HOUR) | (HOUR) |
| 2 | END TIME $A_3$ (HOUR) | (MIN.) | (MIN.) |
| 3 | END TIME $A_4$ (MIN.) | 0 ① | 0 ① |
| 4 | CARRIER DATA 0 ① | | |
| | 0 : CAR 0 | 1 ② | 1 ② |
| 5 | 1 : CAR 1 ② | | |
| 6 | 2 : CAR 2 ③ | 2 ③ | 2 ③ |

FIG. 3

DEFAULT MEMORY TABLE

| | |
|---|---|
| 40 | TRK GROUP NO.<br>(TENANT 0 OR NON) |
| 41 | TRK GROUP NO.<br>(TENANT 1) |
| 42 | RETURN DIAL TONE<br>0 : 'N'/ 1: 'Y' |
| 43 | WARNING TONE ALLOWED<br>0 : 'N'/ 1: 'Y' |
| 44 | SCHEDULING<br>0 : 'N'/ 1: 'Y' |

FIG. 4(a)

INDIVIDUAL-CARRIER MEMORY TABLE

CAR0　CAR1　CAR2

| | |
|---|---|
| 50 | TRK GROUP NO.<br>(TENANT 0 OR NON) |
| 51 | TRK GROUP NO.<br>(TENANT 1) |
| 52 | SEND EXTENTION NO.<br>0 : 'N'/ 1: 'Y' |
| 53 | ACCESS CODE<br><br>(BCD DATA WITHIN<br>4 DIGITS) |
| 55 | PAUSE<br>(1 ~ 8) |

FIG. 4(b)

ELECTRONIC PRIVATE BRANCH EXCHANGE HAVING AN LCR FUNCTION AND A METHOD OF ACCESSING A PARTICULAR COMMON CARRIER IN THAT EXCHANGE

This application is a continuation, of application Ser. No. 07/711,959, filed Jun. 7, 1991, now abandoned.

BACKGROUND OF THE INVENTION

1. Field of the Invention

The present invention relates to an improvement to a call control method and circuit in an electronic private branch exchange having an LCR (Least Cost Routing) function for further improving a reduction effect of the communication cost and enabling access to a particular common carrier in preference to the selection of the least cost route.

2. Description of the Related Art

Recently, going with the market release of the communication enterprises, the number of line suppliers called common carriers has been increasing.

The common carriers are line suppliers who compete in communication costs and set different charging system for use of the lines for users.

Thus, the users are free from being forced to pay a uniform expensive charge, for example, when making a call. The user can select a cheaper common carrier line to save the telephone charge.

Under the background of such situation, various service functions for efficiently accessing lines supplied by a plurality of common carriers are also added to electronic private branch exchanges. One of the service functions of this type known is the Least Cost Routing (LCR) function which automatically selects the minimum cost line from the plurality of common carriers and originates a call on the basis of dialed telephone numbers.

More specifically, in the LCR function, the minimum cost route (the minimum cost common carrier) of the lines accommodated in an electronic private branch exchange is automatically selected on the basis of dialed numbers indicative of an area code. Information required for accessing the selected common carrier is added, and then a call origination is made.

Since the exchange has such function, a user does not need to know information such as a special code "00XX" for accessing a common carrier, and is only required to dial the telephone number of a party to communicate with followed by an LCR access code to realize communication at the minimum cost.

It goes without saying that, if the communication cost involved in the use of the LCR function is considered, the communication cost is further reduced as the number of competing common carriers becomes larger and the respective differences in the communication cost become greater.

However, since the number of common carriers is small, there is no technical intention of causing a plurality of common carriers to compete positively in the present state of the LCR function. There is naturally a limit to the reduction of the communication cost.

If the LCR function operation is considered in the situation in which there are a plurality of common carriers, the respective communication costs of the common carriers vary depending on time when communication is made with the same called party. For example, the communication cost through the use of a first common carrier is minimum at a time A, while the communication cost through the use of a second common carrier is minimum at a time B, and so on.

In a conventional electronic private branch exchange, the respective priorities of the communication costs of the common carriers are fixed through all the time of use, and the selection of minimum cost route is performed on the basis of the fixed setting irrespective of time.

Thus, there may be a case where the user is forced to use an expensive route depending on a communication time, which is a hindrance to reduction of the communication cost.

The convenience of the LCR function in an electronic private branch exchange of this type is also a hindrance to access to a particular common carrier.

For example, if a user wishes to call an operator of a particular common carrier, it is impossible access to that particular target common carrier by using the LCR access code.

Therefore, if the user has a strong intention to access this particular common carrier for the reason mentioned above, the user has to find another way which does not rely on the LCR function.

One of the accessing methods employed in that case is to make a call origination using an access code or a trunk access code to directly capture a trunk corresponding to a particular desired common carrier.

When a call origination is made using this method, it is necessary to input the trunk access code instead of the LCR access code, of course.

If there are a plurality of trunk groups, it is necessary to memorize a plurality of trunk access codes individually in addition to the LCR access code and to input them accurately, so that the calling operation is very complicated.

As described above, in the conventional electronic private branch exchange, the number of routes to be selected is limited due to the small number of common carriers and thus the reduction of the communication cost is very low.

Another reason why the communication cost cannot be reduced is that there are no processes to manage the communication cost for each unit time for each common carrier, and to select a route on the basis of that management data.

Since the minimum cost route is preferentially selected in the LCR function mode in a conventional private branch exchange of this type, it is impossible to access to a particular common carrier by using such LCR function.

Even if the trunk access code is used as one of the ways to code with this problem, the user has to memorize many trunk access codes to be used in addition to the LCR access code and to input those trunk access codes thereto, which would make the calling operation complicated.

SUMMARY OF THE INVENTION

It is an object of the present invention to provide an electronic private branch exchange having an LCR function capable of increasing the number of routes selected using the LCR function, and capable of further improving the cost reduction effect of the communication cost.

It is another object of the present invention to provide an electronic private branch exchange having an LCR function which prevents an increase in the communication cost due to selection of an expensive route depending on time, and which selects the minimum cost route through the overall operating time to thereby further reduce the communication cost.

It is a further object of the present invention to provide a method of accessing a particular common carrier in an electronic private branch exchange having an LCR function capable of accessing a particular common carrier as required in the calling operation in the LCR function mode and realizing access to the particular common carrier by a simple calling operation.

In order to achieve the above objects, the present invention provides an electronic private branch exchange having an LCR function for selecting a route of a cheaper cost line and making a call origination through the route, comprising: first memory means for storing data of a plurality of common carriers each corresponding to a telephone area code; second memory means for storing data indicative of priorities of line costs for the respective common carriers; third memory means for storing identification data of trunk circuits to be captured in correspondence with inherent codes of the respective common carriers; low cost route selecting means, when dial data are inputted by a request for a call origination, for determining a common carrier corresponding to an area code included in the inputted dial data from the data stored in the first memory means and selecting a common carrier of the minimum line cost by referring to the data stored in the second storage means; carrier preferentially selecting means for checking the dial data inputted by the call origination with the data stored in the third memory means, and, when an inherent code of any one of the common carriers is contained in the dial data, selecting a common carrier corresponding to the inherent code in preference to the selection of the common carrier by the low cost route selecting means; and call processing means for obtaining from the data stored in the third memory means identification data of a trunk circuit corresponding to the common carrier selected by either the carrier preferentially selecting means or the low cost route selecting means and performing a calling operation through the trunk circuit.

In an electronic private branch exchange according to the present invention, there is provided time measuring means for measuring a time and for setting the priorities of the line costs of the common carriers in the second memory means in correspondence with time, wherein the low cost route selecting means refers to the time measured by the time measuring means and selects a common carrier of the minimum line cost at the time indicated by the time measuring means.

The present invention also provides a method of accessing a particular common carrier in an electronic private exchange including: memory means for storing a plurality of common carriers in correspondence with telephone area codes, priorities of the line costs of the respective common carriers and identification numbers of trunk circuits to be captured in correspondence with the respective common carriers; low cost route selecting means, when dial data are inputted by a request for a call origination, for selecting the minimum line cost common carrier among the plurality of common carriers corresponding to the area code included in the inputted dial data; designated common carrier selecting means for selecting a common carrier corresponding to an inherent code contained in the dial data in preference to the selection of the common carrier by the low cost route selecting means; and call processing means for making a call with the common carrier selected by either the low cost route selecting means or the designated common carrier selecting means, the method comprising the steps of: inhibiting the selection of a route based on the LCR function, if the inherent code is contained in the dial data input when the call is originated; and preferentially originating a call with the particular common carrier identified with the inherent code.

In the electronic private branch exchange of the present invention, a plurality of common carriers are set in correspondence with telephone area codes for the LCR function. When a call is made using the LCR function, the minimum cost route is selected from the common carriers to thereby substantially increase the number of routes to be selected.

According to such setting, the minimum appropriate cost route selection effective for further reduction of the communication cost is achieved in conformity with the principles of competition that a more advantageous condition can be selected from more set conditions.

In addition, in the present invention, each of the priorities of the communication costs (low cost order) of the common carriers are set in correspondence with a time.

According to such setting, the minimum cost common carrier can be selected minutely in units of time. Thus, further efficient reduction of the telephone charge is achieved together with setting of the plurality of common carriers.

According to the method of accessing a particular common carrier in the electronic private branch exchange of the present invention, a code inherent to each of the common carriers is set. If a particular common carrier is to be accessed in the LCR function mode, the LCR access code and the inherent code of that common carrier are dialed in from the calling side while the exchange side recognizes a request for access to the particular common carrier from the inherent code contained in the inputted dial data. If the request is recognized, the exchange neglects the selection processing of the minimum cost route by the LCR function and preferentially performs the calling operation with the particular common carrier corresponding to the inherent code.

According to the method of the present invention, since the access to a particular common carrier is possible even in the set LCR function mode, a function can be expanded to make possible to communicate through a desired common carrier while maintaining the advantages of the LCR function.

Further, according to the method of the present invention, when a call is originated through a designated particular common carrier, a user is only required to input the inherent code of a target common carrier by the similar operation with the ordinary LCR function and does not need to perform a complicated calling operation as required in the case where a trunk access code is used.

BRIEF DESCRIPTION OF THE DRAWINGS

FIG. 3 shows an illustrative data stored in a second memory 1072 of the memory 107 in the exchange according to the present invention;

FIGS. 4(a) and 4(b) show illustrative data stored in a third memory 1073 of the memory 107 in the exchange according to the present invention.

DESCRIPTION OF THE PREFERRED EMBODIMENT

An embodiment of the present invention will be described below in more detail with reference to the drawings.

Figure 1:
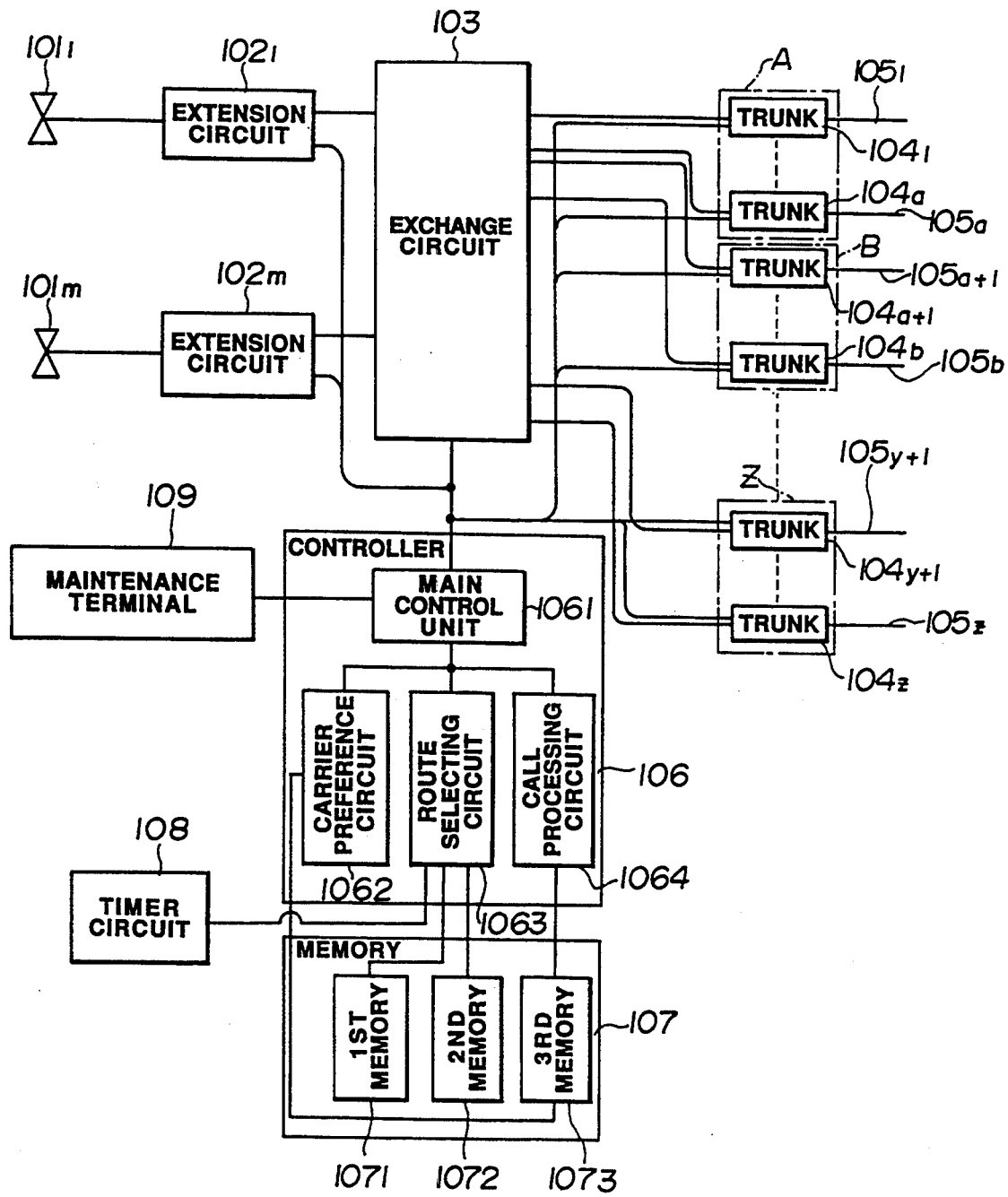
FIG. 1 is a block diagram of one embodiment of an electronic private branch exchange according to the present invention.

FIG. 1 is a block diagram of one embodiment of an electronic private branch exchange according to the present invention.

In FIG. 1, reference numerals 1011 to 101m each denotes a terminal such as a telephone set; 1021 to 102m each, an extension circuit; 103, an exchange circuit; 1041 to 104z each, a trunk circuit; 1051 to 105z each, an office line; 106, a controller; 107, a storage; 108, a timer; and 109, a maintenance terminal.

As shown in FIG. 1, the extension circuits 1021 to 102m are connected to corresponding terminals 1011 to 101m. Similarly, the trunk circuits 1041 to 104z are connected to the corresponding office lines 1051 to 105z.

The exchange circuit 103 connects speech channels between the extension circuits 1021 to 102m or between the extension circuits 1021 to 102m and the trunk circuits 1041 to 104z.

The controller 106 includes, for example, a microcomputer which mainly performs switching operations within the exchange circuit 103, exchanges data between the terminals 1011 to 101m through the extension circuits 1021 to 102m, exchanges dial data or incoming call detection data between the trunk circuits 1041 to 104z.

The controller 106 includes a main control unit 1061, a carrier preference circuit 1062, a route selecting circuit 1063 and a call processing circuit 1064.

The memory 107, the timer circuit 108 and the maintenance terminal 109 supply various pieces of control information involving the LCR function operation to the controller 106.

The memory 107 includes a first memory 1071, a second memory 1072 and a third memory 1073.

The first memory 1071 stores data indicative of a plurality of common carriers corresponding to telephone area codes.

Figure 2:
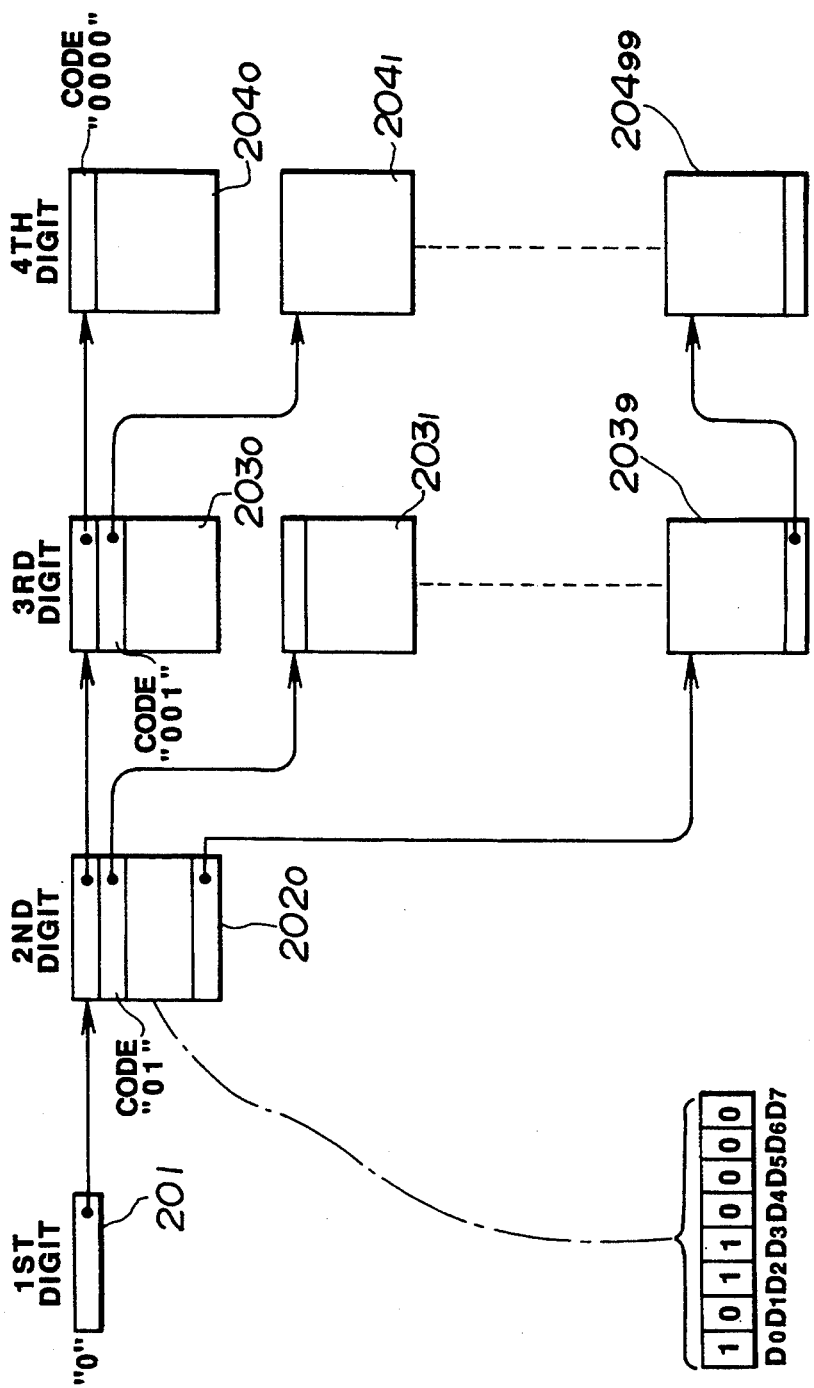
FIG. 2 shows an illustrative data stored in a first memory 1071 of a memory 107 in the exchange according to the present invention.

The specified structure of the first memory 1071 is, for example, shown in FIG. 2. It will be seen according to the memory structure that identification of each common carrier is possible with a 4-digit inherent code (for example, of BCD data) corresponding to a 4-digit telephone area code.

The second memory 1072 stores data indicative of priorities (low cost order) of the communication costs of the common carriers each in correspondence with time.

More specifically, the second memory 1072 is realized by a memory table shown in FIG. 3. In this example, data is stored in the memory table, which data indicates that the low cost order at a time interval (from A2 minutes past A1 (o' clock) to A4 minutes past A3 (o'clock)) indicated by addresses 0-3 becomes the order of carriers (CAR0, 1, 2) indicated by addresses 4 and 5.

Processed data used to actually access the above respective common carriers is stored in the third memory 1073 of the memory 107 and the specified memory structure of the third memory 1073 is shown in FIG. 4.

The memory area of the third memory 1073 is divided into a default memory table (FIG. 4(a)) which stores data for call origination processing required when a call origination is made under the condition where there is no support for the LCR function by the common carriers, and an individual-carrier memory table (FIG. 4(b)) which stores data on trunk calling for the respective carriers required when a call origination is made to access a particular common carrier.

Especially, in this example, trunk numbers each to be captured at a time of originating a call with no support of the LCR function are set in correspondence with tenants at addresses 40 and 41 of the default memory.

Data indicative of the need for sending a dial tone, sending a warning tone and preparing a schedule simultaneously with the above calling operation is set at addresses 42, 43 and 44 of the default memory table.

Trunk numbers each to be captured when call origination is made by specifying a common carrier are stored at addresses 50 and 51 of each individual-carrier memory table of this example in correspondence to the respective tenants of that common carrier (CAR0, 1, 2).

Data indicative of the need for sending an extension number at the time of originating a call is set at an address 52 of the individual-carrier memory table.

An access code required for originating a call by specifying a common carrier is set at an address 53 of the individual-carrier memory table.

In the present invention, the common carrier access code includes, for example, BCD data of 4 digits or less and corresponds to common carrier numbers (FIG. 2) set in the first memory 1071 in correspondence with telephone area codes, Data can be set in the respective memories 1071, 1072 and 1073 of the memory 107, for example, from the maintenance terminal 109 through the controller 106.

Maintenance terminal 109 includes a keyboard and an LCD display and desired data can be input through the keyboard by watching the display.

In the controller 106, the main control unit 1061 takes data inputted from the maintenance terminal 109, transfers the data to the appropriate memories 1071-1073 of the memory 107 and registers it as data set for control of the LCR call origination.

After such data setting, the controller 106 controls, especially, an LCR call origination among various controlling operations while referring to data set in the respective memories of the memory 107.

The main control operation involving the LCR call origination by controller 106 includes selection of the minimum cost route on the basis of the call data.

As mentioned above, in the present invention, data on the communication costs of a plurality of common carriers is set in correspondence with time. The route selection circuit 1063 constantly monitors the time measured by the timer circuit 108 to select the minimum cost route for each time interval using the set data.

Control over the LCR call origination by the controller 106 will be outlined below. In the electronic private branch exchange of the present invention, the terminals 1011 to 101m are connected through extension lines or private lines to the exchange circuit 103 and the controller 106 (carrier preference circuit 1062).

When the carrier preference circuit 1062 receives an LCR call (a call with an LCR access code) through an extension or a private line, it checks whether or not the contents of dial data received after the LCR call corresponds to any one of the access codes (address 53 in FIG. 4(b)) set in the third memory 1073, and determines on the basis of the result of the checking whether or not the call is a request for access to a designated common carrier.

If the carrier preference circuit 1062 determines that the call is a request for access to the designated common carrier (the input dial data coincides with the set access code), it sends the data on the common carrier to the call processing circuit 1064.

The call processing circuit 1064 is connected to the third memory 1073 and with the carrier preference circuit 1062.

The call processing circuit 1064 retrieves the third memory 1073 (addresses 50, 51) on the basis of the data on the common carrier received from the carrier preference circuit 1062 to find a corresponding trunk group, and detects information required for call origination from the third memory 1073 to add it to the call control information. The call processing circuit 1064 then performs a call origination from either one of the trunk circuits 104 of the captured group.

Thereafter, the call processing circuit 1064 controls the exchange circuit 103 in accordance with a response from a called party to connect the appropriate one of the terminals 1011 to 101m to the appropriate one of the trunk circuits 1041 to 104z for speech communication.

If the carrier preference circuit 1062 determines that the call is not a request for access to the designated common carrier, but a request for a call to a regular area code, it detects the corresponding common carrier from the first memory 1071 on the basis of the dial data received from the terminals 1011-101m, and sends data on the common carrier to the route selecting circuit 1063.

The route selecting circuit 1063 refers to the data on the common carrier, the data set in the second memory 1072 (the priorities of the costs each are set in correspondence to time) and the current time obtained from the timer circuit 108 to obtain the highest priority or minimum cost common carrier at the current time and delivers the data to the call processing circuit 1064.

The call processing circuit 1064 seeks a trunk circuit 104 corresponding to the highest priority common carrier through a process similar to that performed when a request for access to the particular common carrier is made, adds required information, and makes a call origination at the minimum expense from that trunk circuit 104.

As just described above, since in the present invention data on the costs separated finely by a parameter of time for more common carriers is set and the minimum cost route is selected on the basis of the set data when a call origination is made in the LCR mode, communication more advantageous in cost can be realized by virtue of the competition of a plurality of common carriers in units of a time.

In addition, in the present invention, the LCR function operation can be released and a particular common carrier is designated and accessed when required while maintaining a cost reduction effect of the communication cost by the LCR function operation.

Since at that time the access code to designate a common carrier to be accessed can be input in a few number of digits and with a feeling similar to that in a regular call origination, the inputting operation is greatly simplified compared to the conventional system where a trunk access code, etc., are required to be input.

Figure 5:
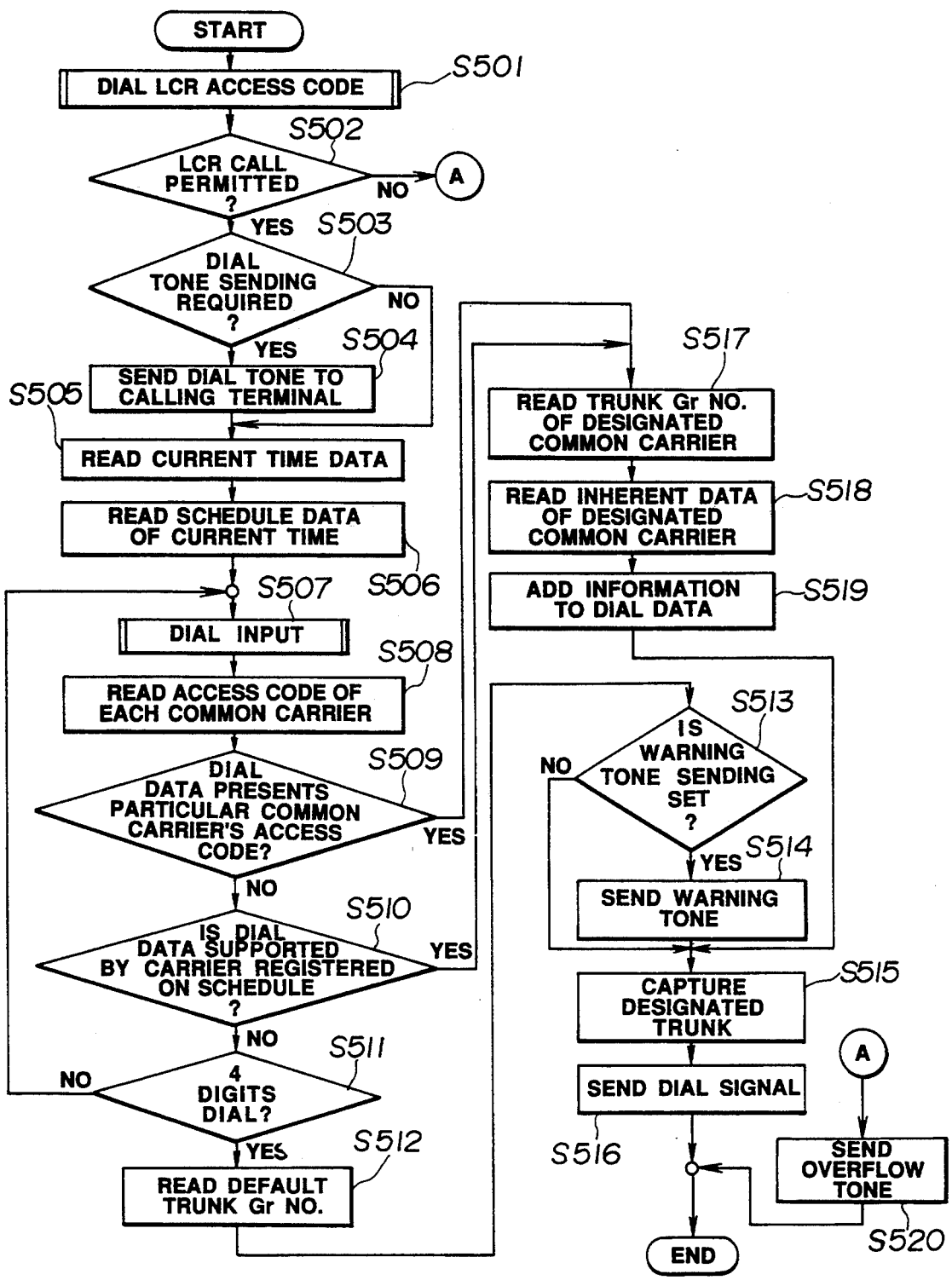
FIG. 5 is a flowchart indicative of an illustrative control operation including an LCR calling operation and a particular common carrier accessing operation carried out by a controller 106 of the exchange according to the present invention.

An illustrative control operation of the controller 106 including the LCR call origination and its releasing operation will be described in more detail with reference to a flowchart of FIG. 5.

When a call origination is made to the trunk circuits 1041 to 104z through an extension or a private line with the intention of selecting the minimum cost route, a predetermined code or an LCR access code preset for that LCR call origination is input as a dial number by the appropriate one of the terminals 1011 to 101m.

If only the selection of the minimum cost route is desired at this time, the dial number of the called party is input after the LCR access code.

If a call origination, but not a regular LCR call origination, is made with the purpose of accessing to a particular common carrier, it is required to input the access code corresponding to the particular common carrier together with the LCR access code at the terminals 1011 to 101m.

In association with this call origination, if the call processing circuit 1064 of the controller 106 detects the LCR access code from an extension (or a private line) (S501), the call processing circuit 1064 determines whether the LCR call origination is permitted in the system (S502).

If the call origination is not permitted, the call processing circuit 1064 sends an overflow tone to the calling terminal (S520) and terminates its processing.

If it is determined at S502 that the LCR call origination is permitted, the call processing circuit 1064 refers to data (FIG. 4(a), address 42) set in the memory table of the third memory 1073 of the memory 107 and determines whether a dial tone is to be sent to the calling terminal (S509).

If it is determined that the dial tone is to be sent, the call processing circuit 1064 delivers the dial tone to the calling terminal in accordance with that determination (S504), and otherwise, the control proceeds to the next step.

As the next process, the route selecting circuit 1063 accesses the timer circuit 108 to recognize the current time (S505).

Subsequently, the route selecting circuit 1063 retrieves the memory table (see FIG. 3) of the second memory 1072 of the memory 107 to read schedule data corresponding to the current time in the data in which the priorities of carriers are set corresponding to time (S506).

Thereafter, it sequentially takes dial data received digit by digit (S507).

Simultaneously, the carrier preference circuit 1062 reads access codes of the plurality of common carriers set in the system from the memory table (FIG.4(b), address 53) of the third memory 1073 of the memory 107 (S508).

Then it compares those access codes with the dial code input at step S507 and determines whether the dial code coincides with a particular common carrier access code (S509).

If it determines that the input dial code is not the particular common carrier access code, the route selecting circuit 1063 determines on the basis of the set data on the memory table of the first memory 1071 of the memory 107 (FIG. 2) whether the dial code is supported by a carrier in the schedule data obtained ah shed S506 (S510).

If it is determined that the dial code is not supported, the route selecting circuit 1063 determines whether the dial input of four digits has been completed (S511). Thereafter, it repeats processing at S507-S511 each time one digit is dialed until the 4-digit dial input is completed.

If the appropriate common carrier cannot still be detected when the 4-digit dial input is completed at S511, the call processing circuit 1064 reads a trunk group number set in the "none-appropriate" (default) memory table in the third memory 1073 (FIG. 4(a)) of the memory 107 (S512).

Simultaneously, the call processing circuit 1064 refers to the memory table (default memory table, address 43, of FIG. 4(a)) and determines whether sending a warning tone is set for the trunk loop number to be read at step S512 (S513).

Only when the sending of the warning tone is set, the call processing circuit 1064 sends the warning tone to the calling terminal (S514).

Thereafter, the call processing circuit 1054 captures an empty trunk circuit 104 in the trunk group (S515) and sends a required dial signal while performing a calling operation (S516)

If the carrier preference circuit 1062 determines at S509 that the input dial code is the particular common carrier access code, the controller 106 neglects the selection of the minimum cost route by the route selecting circuit 1063 and proceeds to a calling processing for the particular common carrier designated at step S509.

As a specified process, the call processing circuit 1064 first reads the trunk group number of the particular common carrier designated in the above-described manner from the memory table of the third memory 1073 (FIG. 4(b)) of the memory 107 (S517).

Thereafter, the call processing circuit 1064 reads from the same memory table as mentioned above inherent data used to make a call origination to the particular common carrier (S518) and adds the inherent data to the code data dialed in (S519).

At that time, the call processing circuit converts the format of the dialed-in code data for access to the appropriate common carrier.

Thereafter, the call processing circuit 1064 captures a trunk 2 corresponding to the group number read at step S517 (S515), and makes a call origination from the trunk circuit 104 on the basis of the dial data converted in the format and accompanied by the inherent data (S516).

When the common carrier supporting is detected at S510, the route selecting circuit 1063 selects the highest priority common carrier or the minimum cost common carrier at the appropriate time on the basis of the data set on the memory table of the second memory 1072 (FIG. 3) of the memory 107 and the schedule data obtained at step S506.

Thereafter, the calling operation is performed by the call processing circuit 1064 through step S517 in a manner similar to that mentioned above.

First, the call processing circuit 1064 reads the trunk group number of the minimum cost common carrier selected as mentioned above at step S517.

Subsequently, it reads inherent data used to make a call origination to the common carrier (S518) and adds the inherent data Go the dialed code data (S519).

Thereafter, the call processing circuit 1064 captures the trunk circuit 104 corresponding to the group number read at step S517 (S515) and performs a calling operation from the trunk 2 on the basis of the dial data processed as mentioned above (S516).

If the trunk circuit 104 corresponding to the highest priority common carrier in the calling operation is not empty in the calling operation, the call processing circuit checks whether a trunk circuit corresponding to a common carrier having the second priority is empty. If so, it is possible to perform a calling operation through steps S517-519, S515 and 516, of course.

As an application of the present invention, arrangement may be such that, for example, a special-purpose button by which an inherent code of a particular common carrier is inputted with a simple press is provided to automatically input the inherent code of that particular common carrier by pressing down the special-purpose button after inputting the LCR access code. In this case, a calling operation with a designated common carrier can be further simplified.

In the process performed subsequent to S512 when the appropriate common carrier cannot be found, the default memory table (FIG. 4(b)) in the third memory 1073 of the memory 107 is referred to. If data "1" is set at the address 43 therein, a warning tone is sent to the calling terminal to inform the calling terminal that there is no choice but access to an expensive carrier, as illustrated with reference to steps S513 and 514.

Of course, the number of registered common carriers, the number of digits of the inherent code described in those embodiments and services such as tone sending may be changed when required.

As described above, in the present invention, a plurality of common carriers are registered in correspondence with inherent codes. If an inherent code is found in the dial data used when a call origination is made, selection of the minimum cost route is neglected, and a calling operation from a trunk corresponding to the common carrier of the inherent code is preferentially performed. Therefore, also when a particular common carrier is to be accessed, a calling operation is required to be performed in conformity with the LCR calling. Thus, a request for telephonic communication with the operator of the particular common carrier is satisfied by a simple operation including adding the inherent code of the desired common carrier to the LCR access code and inputting the result.

In addition, in the present invention, the highest priority (low cost) common carrier can be used when a call origination is made among the common carriers set in correspondence to telephone area numbers in an ordinary LCR calling mode in which a call origination is made without designating a common carrier, so that further reduction of the communication cost by virtue of the competition between more conditions is expected.

What is claimed is:

1. An electronic private branch exchange having a least cost routing (LCR) function for selecting a least cost route in response to dial data inputted subsequent to an LCR access code and making a call origination through the selected route, comprising:

first memory means for storing data indicative of a plurality of common carriers each corresponding to a telephone area code;

second memory means for storing data indicative of priorities of line costs for the respective common carriers;

third memory means for storing identification data of trunk circuits to be used when accessing each of the common carriers in correspondence with carrier access codes of the respective common carriers, each of the carrier access codes and the telephone area codes having the same number of digits;

judging means for extracting dial data having the same number of digits as the telephone area code and inputted subsequent to the LCR access code and judging whether the extracted dial data is the telephone area code or the carrier access code;

LCR call origination processing means, when the extracted dial data is the telephone area code, for capturing a trunk circuit corresponding to a least cost common carrier from among the common carriers corresponding to the extracted telephone area code and making a call origination; and carrier accessing means, when the extracted dial data is the carrier access code, for making a call origination through the trunk circuit corresponding to the extracted carrier access code, wherein, after an LCR mode is set by inputting the LCR access code, either an LCR call origination or a carrier designated call origination is initiated at a time when the dial data having the same number of digits to the telephone area code is inputted subsequent to the LCR access code.

2. An electronic private branch exchange according to claim 1, further comprising means for measuring time and for adjusting the line costs of the common carriers in the second memory means in correspondence with the measured time, and wherein the LCR call origination processing means captures a common carrier of the minimum line cost at the measured time by the time measuring means when the judging means does not judge a common carrier access code.

3. An electronic private branch exchange according to claim 2, further comprising an external maintenance terminal including at least a key for inputting various data and wherein the data is written in the first, second and third memory means by operating the key in the maintenance terminal.

4. An electronic private branch exchange according to claim 1, wherein if a trunk circuit corresponding to the common carrier selected by the LCR call origination processing means is not idle, the LCR call origination processing means continues to capture an idle trunk circuit in accordance with the line costs.

5. An electronic private branch exchange according to claim 1, wherein the third memory means includes a default memory for storing identification data of a default trunk circuit, and wherein if the judging means judges that the number inputted subsequent to the LCR access code is a telephone area code and if data of a common carrier corresponding to the inputted standard telephone area number is not stored in the first memory, the LCR call origination processing means selects a default trunk circuit and originates a call through the default trunk circuit.

6. An electronic private branch exchange according to claim 5 further comprising means for indicating whether the default trunk circuit has been selected.

7. An electronic private branch exchange according to claim 1, further comprising an external maintenance terminal including at least a key for inputting various data and wherein the data is written in the first, second and third memory means by operating the key in the maintenance terminal.

8. An electronic private branch exchange according to claim 1, wherein the calling terminal includes an LCR function mode setting key for setting an LCR function mode and a particular button for instantaneously inputting a carrier access code of a particular common carrier, and wherein when a call origination is made by designating a common carrier, the particular button is pressed subsequent to the pressing of the LCR function mode setting key to thereby input the dial data.

9. A method of accessing a particular common carrier for an electronic private branch exchange having a least cost routing (LCR) function for selecting a least cost route in response to dial data inputted subsequent to an LCR access code and making a call origination through the selected route, comprising the steps of:

storing data indicative of a plurality of common carriers each corresponding to a telephone area code;

storing data indicative of priorities of line costs for the respective common carriers;

storing identification data of trunk circuits to be used when accessing each of the common carriers in correspondence with carrier access codes of the respective common carriers, each of the carrier access codes and the telephone area codes having the same number of digits;

extracting inputted dial data having the same number of digits as the telephone area code and inputted subsequent to the LCR access code;

judging whether the extracted dial data is the telephone area code or the carrier access code;

when the extracted dial data is the telephone area code, capturing a trunk circuit corresponding to a least cost common carrier from among the common carriers corresponding to the extracted telephone area code and making a call origination; and when the extracted dial data is a carrier access code, making a call origination through the trunk circuit corresponding to the extracted carrier access code, wherein, by inputting the carrier access code subsequent to the LCR access code after an LCR mode is set by inputting the LCR access code, the LCR call origination is able to be switched to the carrier designated call origination at a time when the dial data having the same number of digits to the telephone area code is inputted.

10. A method according to claim 9, further comprising the steps of:

measuring time; and adjusting the line costs of the common carriers in correspondence with the measured time, and wherein the least cost route capturing step comprises the step of selecting a common carrier of the least line cost at the measured time.

11. A method according to claim 10, wherein the data storing is carried out by operating a key in a maintenance terminal connected to the exchange.

12. A method according to claim 9, wherein if the trunk circuit captured in the least cost route capturing step is not idle, selection of an appropriate common carrier is continued in accordance with the line costs until an idle trunk circuit is found.

13. A method according to claim 9, further including the step of storing, in a default memory area, identification data of a default trunk circuit, and wherein if no common carrier is selected, the default trunk circuit is selected.

14. A method according to claim 13, further including the step of indicating whether the default trunk circuit has been selected.

15. A method according to claim 9, wherein the data storing is carried out by operating a key in a maintenance terminal connected to the exchange.

16. A method according to claim 9, wherein the calling terminal includes a function key for setting a least cost routing (LCR) function mode and a button for inputting a code of a particular common carrier, and wherein when a call is made by designating a common carrier, the button is pressed subsequent to the pressing of the function key to thereby input the dial data.

* * * * *